United States Patent
Heck et al.

(10) Patent No.: US 8,845,035 B2
(45) Date of Patent: Sep. 30, 2014

(54) VEHICLE WHEEL COVER AND VEHICLE WHEEL COVER RETENTION SYSTEM AND METHOD FOR PRODUCING SAME

(75) Inventors: Thomas E. Heck, Monroe, MI (US); Douglas P. Mason, Livonia, MI (US); David Frankling, Belleville, MI (US); Rick Wyatt, Birmingham, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 1327 days.

(21) Appl. No.: 12/085,613

(22) PCT Filed: Nov. 30, 2006

(86) PCT No.: PCT/US2006/045819
§ 371 (c)(1),
(2), (4) Date: Jul. 29, 2010

(87) PCT Pub. No.: WO2007/064780
PCT Pub. Date: Jun. 7, 2007

(65) Prior Publication Data
US 2010/0301661 A1    Dec. 2, 2010

Related U.S. Application Data

(60) Provisional application No. 60/740,881, filed on Nov. 30, 2005.

(51) Int. Cl.
*B60B 7/06* (2006.01)
*B60B 7/12* (2006.01)
(52) U.S. Cl.
CPC ...................................... *B60B 7/12* (2013.01)

USPC ................ 301/37.35; 301/37.102; 301/37.33; 301/37.11

(58) Field of Classification Search
USPC .................. 301/37.33, 37.101, 37.28, 37.102, 301/37.31, 37.11, 37.35, 37.39, 37.42
See application file for complete search history.

(56) References Cited

U.S. PATENT DOCUMENTS

| 4,530,542 A * | 7/1985 | Spiegel et al. ........... 301/37.376 |
| 5,188,429 A | 2/1993 | Heck et al. |
| 5,340,418 A | 8/1994 | Wei |
| 5,360,261 A | 11/1994 | Archibald et al. |
| 5,421,642 A | 6/1995 | Archibald |
| 5,533,261 A | 7/1996 | Kemmerer |
| 5,564,792 A | 10/1996 | Archibald |

(Continued)

FOREIGN PATENT DOCUMENTS

EP            310777 A1 *  4/1989  ................. 301/37.35

*Primary Examiner* — Jason Bellinger
(74) *Attorney, Agent, or Firm* — MacMillan, Sobanski & Todd, LLC

(57) ABSTRACT

A vehicle wheel cover retention system includes a wheel defining an axis and includes a wheel rim and a wheel disc. The wheel disc has a generally radially outwardly extending retention groove formed in a generally axially extending portion of an inner mounting surface thereof. The cover includes an inner portion having a central opening. The inner portion is provided with at least one wheel cover retention member having at least one tab. A center cap is provided and includes at least one center cap retention member having at least one tab. The at least one tab of the at least one wheel cover retention member and the at least one tab of the center cap retention member are both received in the retention groove to secure both the wheel cover and the center cap to the wheel.

13 Claims, 5 Drawing Sheets

(56) References Cited

U.S. PATENT DOCUMENTS

| | | | |
|---|---|---|---|
| 5,577,809 A * | 11/1996 | Chase | 301/37.43 |
| 6,022,081 A | 2/2000 | Hauler et al. | |
| 6,402,254 B1 | 6/2002 | Eikhoff et al. | |
| 6,457,781 B1 | 10/2002 | Cutcher et al. | |
| 6,609,763 B1 | 8/2003 | Kinstler et al. | |
| 6,637,832 B2 * | 10/2003 | Wrase et al. | 301/37.31 |
| 6,663,189 B2 * | 12/2003 | Enomoto et al. | 301/37.36 |
| 6,779,852 B2 | 8/2004 | Van Houten et al. | |
| 6,969,124 B2 | 11/2005 | Gerard | |
| 7,204,562 B2 | 4/2007 | Gerard | |
| 7,300,116 B2 | 11/2007 | Bruce et al. | |
| 7,416,260 B1 | 8/2008 | Cuevas et al. | |
| 2002/0153763 A1 | 10/2002 | Van Houten et al. | |
| 2003/0047987 A1 | 3/2003 | Enomoto et al. | |
| 2003/0067212 A1 | 4/2003 | Wrase et al. | |
| 2005/0073191 A1 | 4/2005 | Gerard | |
| 2006/0125311 A1 | 6/2006 | Bruce et al. | |

* cited by examiner

US 8,845,035 B2

VEHICLE WHEEL COVER AND VEHICLE WHEEL COVER RETENTION SYSTEM AND METHOD FOR PRODUCING SAME

CROSS-REFERENCE TO RELATED APPLICATIONS

This application is a national stage of International Application No. PCT/US2006/045819 filed Nov. 30, 2006, the disclosures of which are incorporated herein by reference in entirety, which was based on U.S. Provisional Application No. 60/740,881 filed Nov. 30, 2005, the disclosures of which are incorporated herein by reference in entirety.

BACKGROUND OF THE INVENTION

This invention relates in general to vehicle wheels and, in particular, to an improved vehicle wheel cover and vehicle wheel cover retention system and method for producing the same.

BACKGROUND OF THE INVENTION

This invention relates in general to vehicle wheels and in particular to an improved vehicle wheel cover retention system and method for producing the same.

Full or partial vehicle wheel covers of the removable type are well known and have been used for many years to enhance the styling of conventional, stamped wheel discs. Also, it is known to permanently secure a full or partial wheel cover to a vehicle wheel using an adhesive.

SUMMARY OF THE INVENTION

This invention relates to a vehicle wheel cover, a vehicle wheel cover retention system for securing the wheel cover to a vehicle wheel, and a method for producing the same.

According to one embodiment, the vehicle wheel cover retention system comprises a wheel defining an axis and formed from a suitable material and including a wheel rim and a wheel disc. The wheel disc includes a generally centrally located wheel mounting surface and an outer annular portion which defines an outboard face. The wheel disc has a generally radially outwardly extending retention groove formed in a generally axially extending portion of the inner mounting surface thereof. The wheel cover is formed from a suitable material and includes an inner surface, an outer surface and an inner portion having a central opening. The inner portion is provided with at least one wheel cover retention member. The at least one wheel cover retention member provided with at least one tab. A center cap is provided and is formed from a suitable material and includes at least one center cap retention member. The at least one center cap retention member provided with at least one tab. The at least one tab of the at least one wheel cover retention member and the at least one tab of the center cap retention member are both received in the retention groove of the wheel disc to thereby secure both the wheel cover and the center cap to the wheel.

According to another embodiment, the method for producing a vehicle wheel comprising the steps of: (a) providing a wheel defining an axis and formed from a suitable material and including a wheel rim and a wheel disc, the wheel disc including a generally centrally located wheel mounting surface and an outer annular portion which defines an outboard face, the wheel disc having a generally radially outwardly extending retention groove formed in a generally axially extending portion of the inner mounting surface thereof; (b) providing a wheel cover formed from a suitable material and including an inner surface, an outer surface and an inner portion having a central opening, the inner portion provided with at least one wheel cover retention member, the at least one wheel cover retention member provided with at least one tab; (c) providing a center cap formed from a suitable material and including at least one center cap retention member, the at least one center cap retention member provided with at least one tab; (d) installing the wheel cover on the wheel wherein the at least one tab of the at least one wheel cover retention member is received in the retention groove of the wheel disc to thereby secure the wheel cover to the wheel; and (e) installing the center cap on the wheel wherein the at least one tab of the at least one center cap retention member is received in the retention groove to thereby secure the center cap to the wheel.

According to yet another embodiment, the vehicle wheel cover comprises: a wheel cover formed from a suitable material and including an inner surface, an outer surface and an inner portion having a central opening. The inner portion is provided with at least one wheel cover retention member. The at least one wheel cover retention member provided with at least one tab which is adapted to be received in a radially outwardly extending retention groove formed in a generally axially extending portion of an inner mounting surface of a wheel disc of the vehicle wheel.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
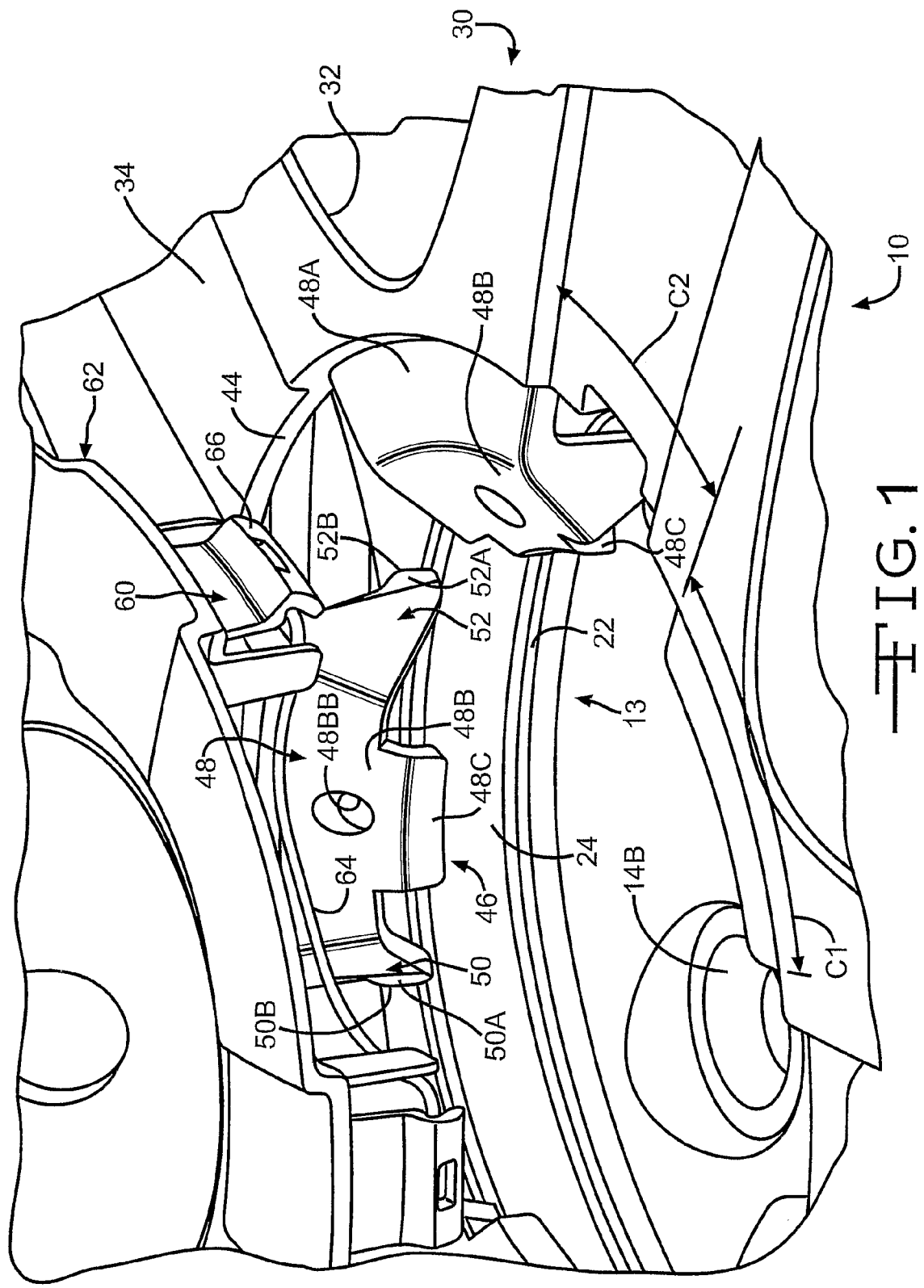
FIG. 1 is a view of a portion of a first embodiment of a vehicle wheel cover and a vehicle wheel cover retention system, showing the wheel cover and a center cap of the wheel cover retention system prior to the installation.
Figure 2:
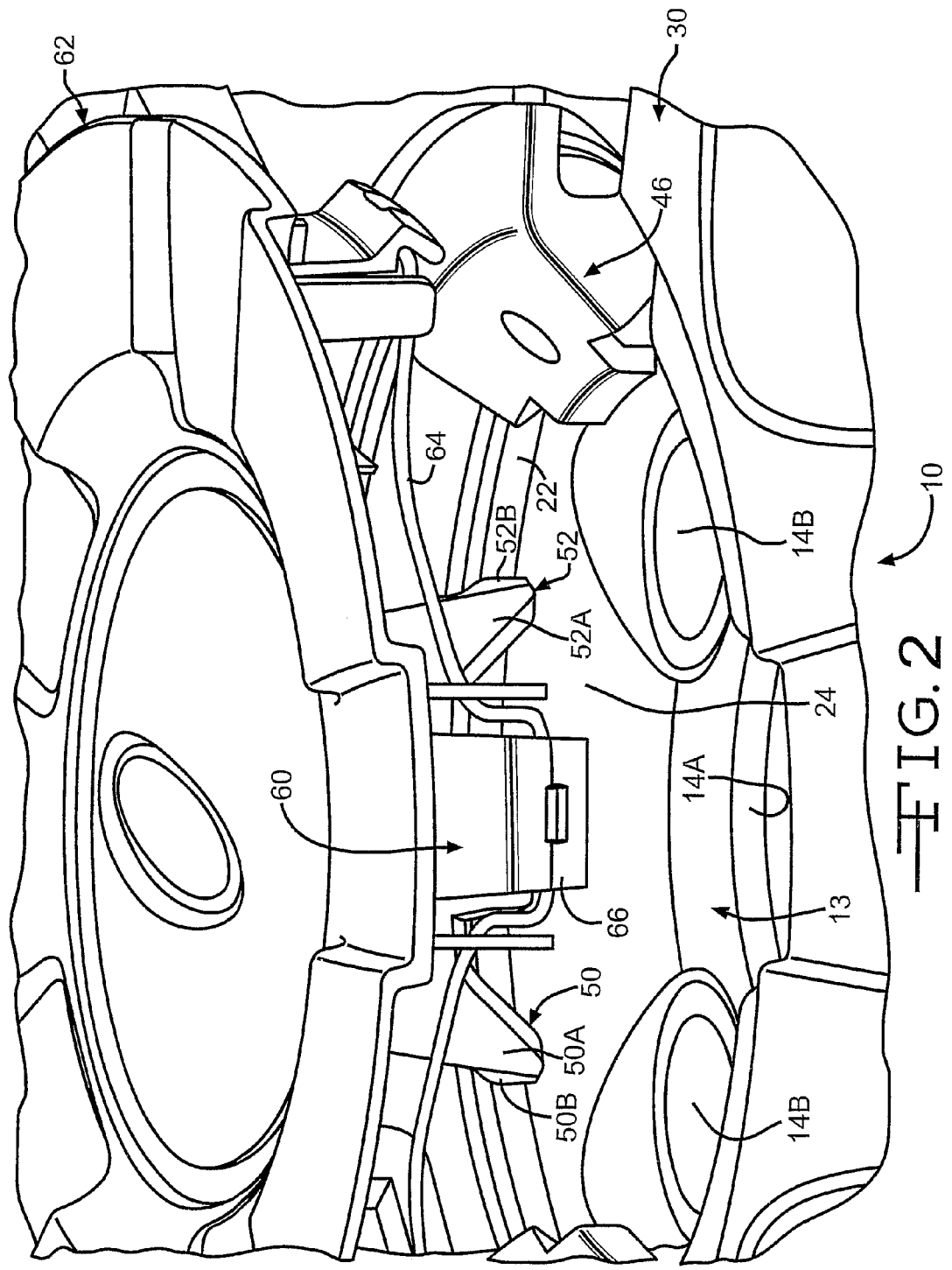
FIG. 2 is another view of a portion of the first embodiment of the vehicle wheel cover and the vehicle wheel cover retention system, showing the wheel cover in the installed position and the center cap prior to installation.
Figure 3:
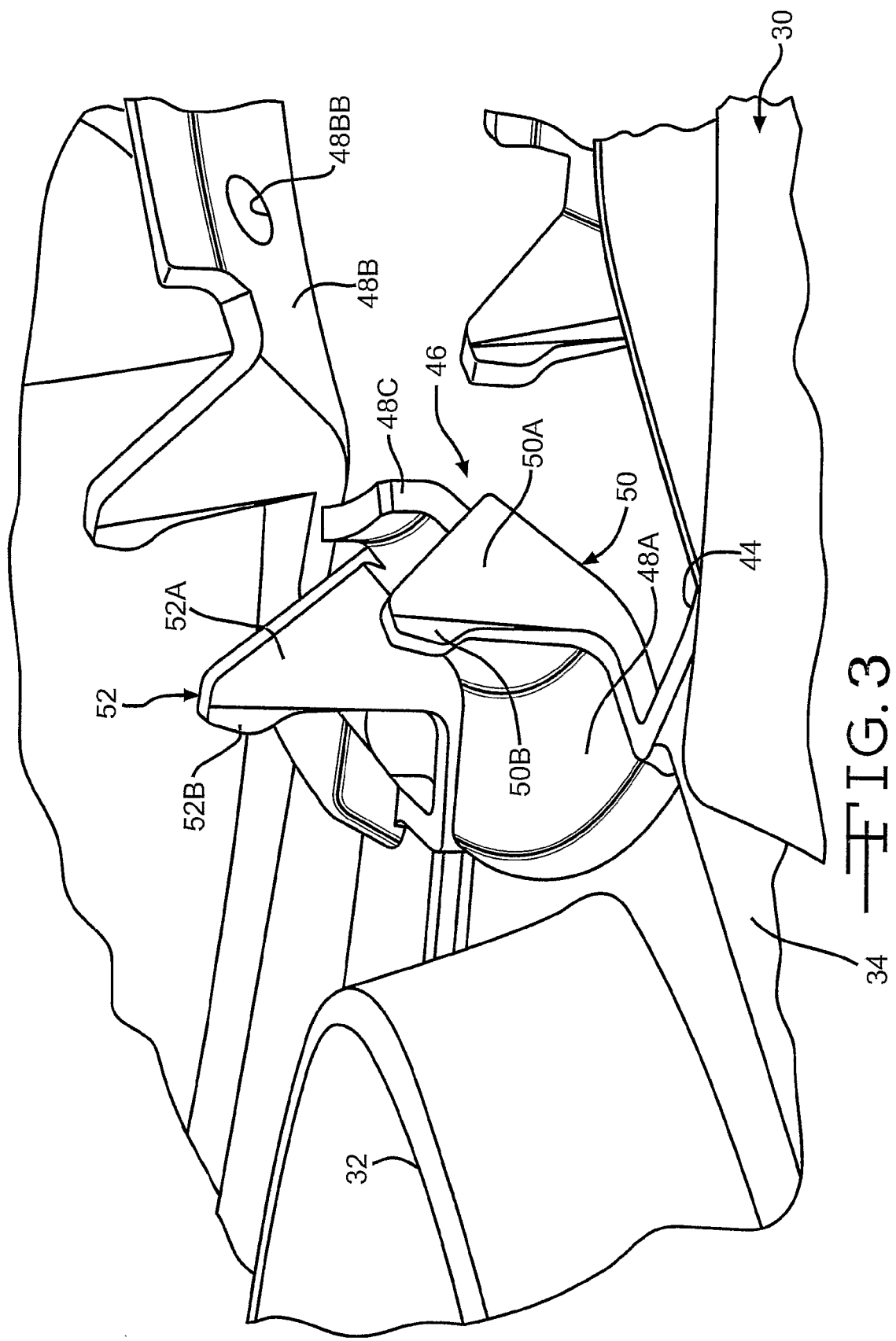
FIG. 3 is a rear view of the vehicle wheel cover illustrated in FIGS. 1 and 2.
Figure 4:
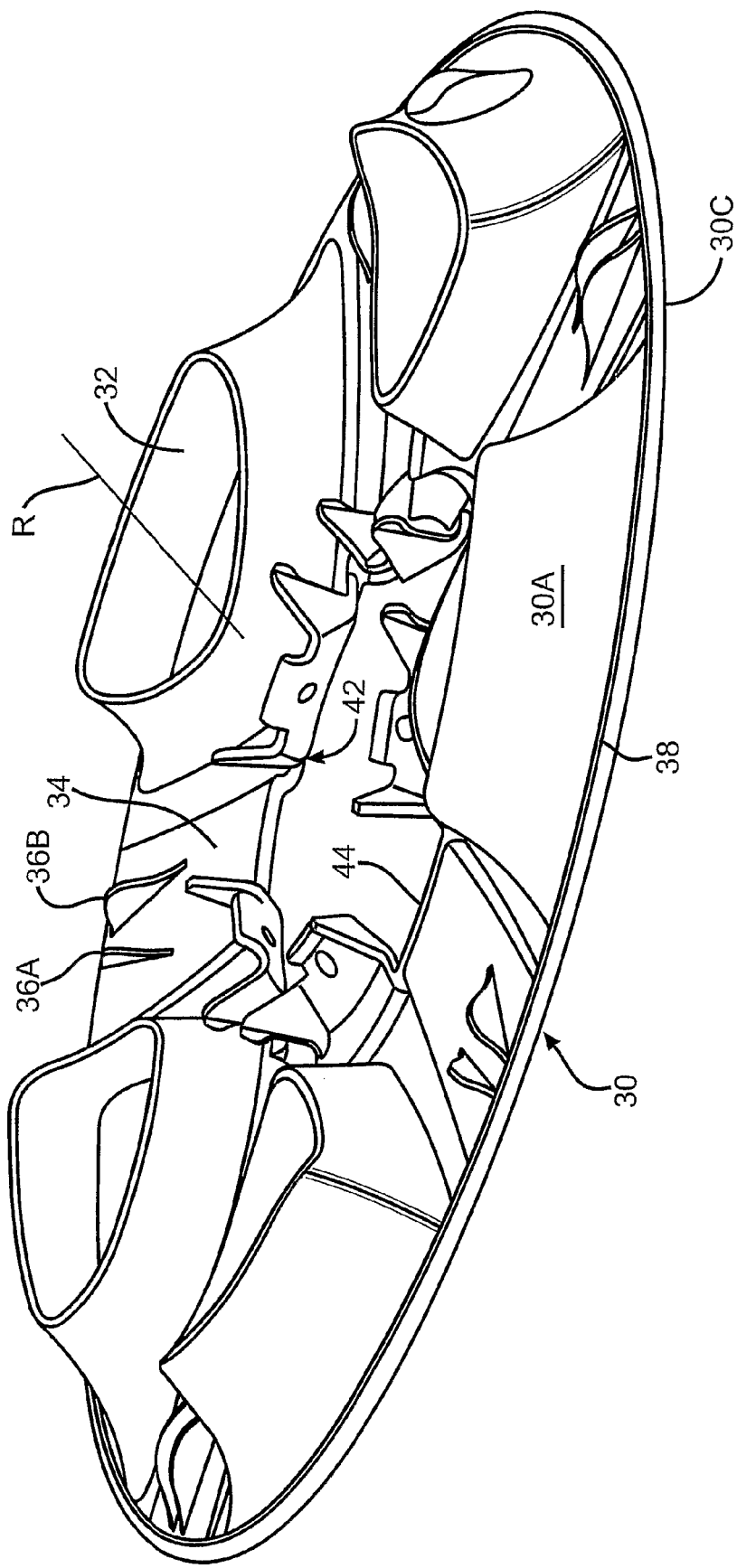
FIG. 4 is an enlarged view of a portion of the vehicle wheel cover illustrated in FIGS. 1-4.
Figure 5:
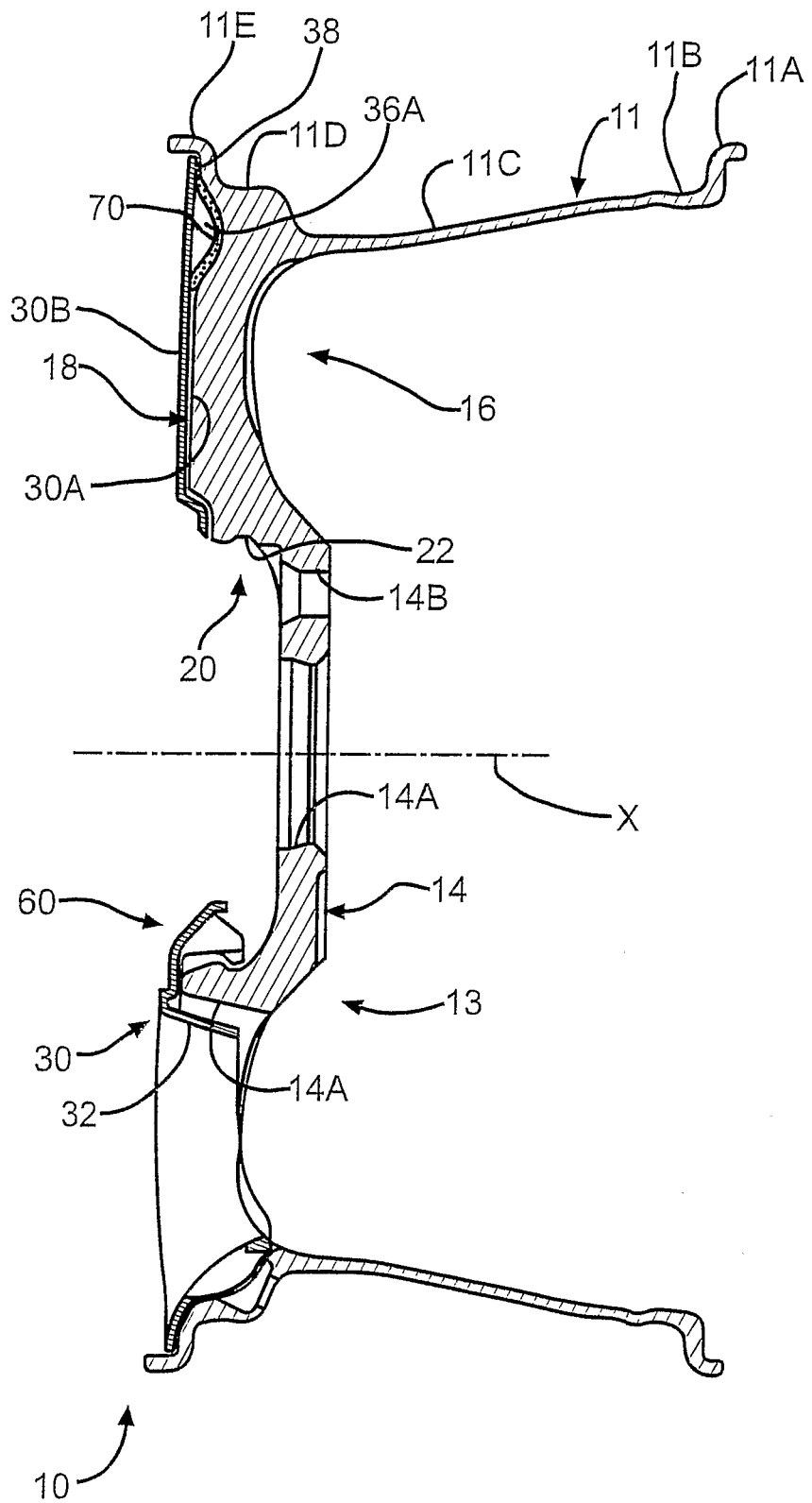
FIG. 5 is a sectional view through a portion of the vehicle wheel, showing only the wheel cover being attached.

Referring now to the drawings, there is illustrated in FIGS. 1-2 a portion of a first embodiment of a vehicle wheel, indicated generally at 10, including a first embodiment of a vehicle wheel cover, indicated generally at 30 and vehicle wheel cover retention system, indicated generally at 60. As shown in FIG. 5, the vehicle wheel 10 defines an axis X and may be of any suitable type of material or materials, such as for example, steel, aluminum and alloys thereof, and may be of any suitable type of wheel construction, such as for example, a "full face" type of wheel, such as shown in FIG. 5A of U.S. Pat. No. 5,533,261 to Kemmerer, a "bead seat attached" wheel such as shown in FIG. 4 of U.S. Pat. No. 5,188,429 to Heck et al., a "well attached" wheel such as shown in FIG. 3 of U.S. Pat. No. 5,188,429 to Heck et al., a "bimetal" wheel construction including an aluminum disc and a steel rim such as shown in U.S. Pat. No. 5,421,642 to Wei et al., a "modular wheel" construction such as shown in U.S. Pat. No. 5,360,261 to Archibald et al., a cast aluminum wheel such as shown in U.S. Pat. No. 5,340,418 to Wei, or a euro-flange type of wheel such as shown in U.S. Pat. No. 5,564,792 to Archibald, the disclosures of all of these patents incorporated by reference in entirety herein.

As best shown in FIG. 5, in the illustrated embodiment the vehicle wheel 10 is a one-piece full cast aluminum wheel and includes a wheel rim, indicated generally at 11, and a wheel disc, indicated generally at 13. The wheel rim 11 includes an inboard tire bead seat retaining flange 11A, and inboard tire bead seat 11B, a generally axially extending well 11C, and outboard tire bead seat 11D, and an outboard tire bead seat retaining flange 11E. Alternatively, the construction, material and/or make-up of the wheel rim 12 may be other than illustrated if so desired.

The wheel disc 13 includes a generally centrally located wheel mounting surface or portion 14, an outer annular portion 16, and defines an outer surface or outboard face 18. As will be discussed below, the wheel disc 13 further includes a retention feature, indicated generally at 20, formed therein.

The inner mounting surface 14 of the wheel disc 13 is provided with a center hub hole 14A and a plurality of lug bolt mounting holes 14B spaced circumferentially around the center hub hole 14A (one of such lug bolt mounting holes 14B illustrated in FIGS. 1 and 5 and two of such lug bolt mounting holes 14B illustrated in FIG. 2). The lug bolt receiving holes 14B are adapted to receive lug bolts (not shown) and nuts (not shown) for securing the vehicle wheel 10 on an axle (not shown) of a vehicle.

In the illustrated embodiment, the retention feature 20 is formed as a radially outwardly extending annular groove or recess 22 formed in an axially extending portion or wall 24 of the inner mounting surface 14 of the wheel 10. Preferably, as shown in the illustrated embodiment, the groove 22 is a continuous groove having a predetermined radius which is preferably machined in the wheel 10 to predetermined tolerances following the casting of the wheel 10 in order to provide the retention purpose to be described below. The particular shape, profile and/or location of the groove 22 may be other than illustrated if so desired.

Also, the groove 22 may be formed by other methods if so desired. For example, depending upon the particular construction of the wheel, such as if the wheel is formed from steel, aluminum, magnesium or alloys thereof, the groove 22 may be formed by other suitable processes for such materials, such as for example by grinding, cutting, machining, rolling and stamping during the forming of the wheel 10 itself (or only the wheel disc portion of the wheel in the case of a fabricated wheel (i.e., a non-cast one-piece wheel), or the groove 22 may be formed subsequent to the forming process if so desired. Alternatively, the construction, material and/or make-up of the vehicle wheel 10, including the location and/or the shape of the groove 22, may be other than illustrated if so desired.

According to the illustrated embodiment of the wheel cover retention system 60, the wheel cover 30 is provided. In the illustrated embodiment, the wheel cover 30 is formed from plastic and is a one-piece wheel cover and may have at least an outer surface which is painted, chrome-plated or otherwise adorned or decorated as desired. Alternatively, the wheel cover 30 may be formed from other materials, such as metal and/or may be a multi-piece wheel cover formed of like or unlike materials if so desired. The wheel cover 30 may have an inner surface which closely conforms to the outboard face of the wheel, may have an inner surface which is spaced from the outboard face of the wheel to impart the styling to the wheel, or may have a combination of both an inner surface which conforms and an inner surface which is spaced apart from the outboard face of the wheel.

As best shown in FIG. 5, the wheel cover 30 includes an inner surface 30A and an outer surface 30B. The inner surface 30A generally resembles the shape of the outboard face 18 of the wheel 10 and may or may not be closely positioned adjacent to the outboard face 14 of the wheel 10. In the illustrated embodiment, the wheel cover 30 includes openings 32 which generally resemble windows 14A provided in the outboard face 14 of the wheel 10 and spokes 34 with generally resemble spokes 14B of the wheel 10.

In the illustrated embodiment, the inner surface 30A of the wheel cover 30 in the outer areas of the spokes 34 is positioned spaced apart from the outboard face 14 of the wheel 10 to leave a "substantial" gap therebetween. Such a substantial gap may be in the range of from about 0.5 mm to about 2 mm when a non-foaming adhesive is used, as discussed below, and greater than about 5 mm when a foaming adhesive is used, as discussed below. As a result of this, in the illustrated embodiment, the inner surface 30A of the wheel cover 30 is provided with a pair of spaced apart standoffs or projections 36A and 36B, shown in FIGS. 4 and 5, in the outer areas of each of the spokes 34 thereof. The standoffs 36A and 36B are preferably adapted to be slightly spaced apart from contact with the outboard face 18 of the wheel 10; however, due to manufacturing tolerances, the standoffs 36A and/or 36B may slightly contact at least a portion of the outboard face 18 of the wheel 10 in some instances. In the illustrated embodiment, the standoffs 36A and 36B are identical to one another and are located near an outer periphery 30C of the wheel cover 30 and have a generally rounded shape or profile. Alternatively, the construction, location, number and/or makeup of the standoffs 36A and 36B may be other than illustrated if so desired.

Also, in the illustrated embodiment, the inner surface 30A of the wheel cover 30 is preferably provided a circumferential outer diameter projection or standoff 38 for a purpose to be discussed below. In the illustrated embodiment, the standoff 38 is a continuous standoff and is located on the inner surface 30A of the cover 30 adjacent the outer periphery 30C thereof. Preferably, as shown in the illustrated embodiment, the standoff 38 is adapted to engage or contact the outboard face 18 of the wheel 10 when the cover 30 is assembled. Alternatively, the construction, location, number and/or makeup of the standoff 38 may be other than illustrated if so desired.

The wheel cover 30 further includes an inner portion, indicated generally at 42, having a central opening 44. The inner portion 44 is provided with a plurality of extensions or retention members 46 which extend inwardly from the central opening 44. As shown in FIG. 4, in the illustrated embodiment, the wheel cover 30 includes five such retention members 46 which are located circumferentially about the opening 44. In the illustrated embodiment, a respective one of each of the retention members 46 is located along a radial line R which is symmetrical with respect to the openings 32. Alternatively, the location of the members 46 may be other than illustrated if so desired.

In the illustrated embodiment, each retention member 46 is identical to one another and includes a first or middle portion 48 and a pair of spaced apart second or end portions 50 and 52 provided thereon. In the illustrated embodiment, the middle portion 48 includes a first or upper portion 48A, a second or intermediate portion 48B and a third or inner portion 48C. The first portion 48A extends generally radially inwardly and generally perpendicular with respect to the wheel axis X. The second portion 48B is angled relative to the first portion 48A and extends generally radially inwardly. In the illustrated embodiment, the second portion 48B includes an opening 48BB formed therein. The third portion 48C is angled relative to the second portion 48B and extends generally axially inwardly and generally parallel with respect to the wheel axis X.

The end portions 50 and 52 extend generally axially inwardly toward the center hub hole 18A and generally perpendicular with respect to the first portion 48A. In the illustrated embodiment, the end portion 50 is provided with a "snap in" tab or extension 50A and the end portion 52 is provided with a snap in tab or extension 52A. As can be seen, each of the tabs 50A and 52A extends generally radially outwardly toward the opening 44 of the cover 30. Each of the tabs 50A and 52A of the retention members 46 have a generally rounded shaped outer surface 50B and 52B, respectively, and is adapted to engage or be received into the groove 22 provided in the vehicle wheel 10 during the installation of the wheel cover 30.

Alternatively, the construction, number, location and/or makeup of one or more of the retention members 46 may be other than illustrated if so desired. For example, instead of the illustrated pair of the tabs 50A and 52A on each of the retention members 46, each of the retention members 46 may be provided with a single continuous tab or each of the retention members 46 may be provided with more than two tabs if so desired.

As shown in FIG. 1, each retention member 46 extends a first circumferential distance C1 and between each pair of the members 46 there is defined a circumferential space or gap G that extends a second circumferential distance C2. In the illustrated embodiment, the first circumferential distance C1 is approximately equal to the second circumferential distance C2. Preferably, the second circumferential distance C2 is preselected to allow a plurality of "snap in tab" retention members 60 of a center cap, indicated generally at 62, to fit therein so as to be received also in the groove 22 to thereby secure the center cap 62 to the wheel. As shown in the illustrated embodiment, the center cap 62 includes a spring 64 which extends circumferentially around the center cap 62 and which is operative to apply a radially outward biasing force to associated "snap" tabs 66 of each of the retention members 60 so as to assist in retaining the tabs 66 in the groove 22. As can be understood, in the method of assembly, the wheel cover 30 is first installed on the wheel 10 and then the center cap 62 is installed.

Preferably, in the illustrated embodiment, the wheel cover 30 is permanently secured to the vehicle wheel 10 with an adhesive. Preferably, the adhesive is selectively applied so as to be between the outboard face of the wheel 10 and an inner surface of the wheel cover 30. The adhesive may be applied in a pre-assembly pattern so as to result in a full surface post-assembly pattern or in a non-full surface post-assembly pattern, i.e., a post-assembly pattern which has voids or gaps therein. Suitable adhesives may include but are not limited to the use of one or a combination of more than one of adhesives selected from the group consisting of silicone, two-part epoxy, urethane, double-sided tape, expanding foam, and the like.

In the illustrated embodiment, a two-part urethane adhesive 70 is preferably selectively applied to the outboard face 18 in a predetermined pre-assembly pattern which results in a post-assembly pattern which has voids therein, as shown in FIG. 5 (FIG. 5 showing only showing the adhesive 70 in some of the areas between the inner surface 30A of the cover 30 and the outboard face 18 of the wheel 10 for discussion purposes). Alternatively, the cover 30 may be secured to the wheel 10 by other suitable materials and/or processes if so desired. Depending upon the particular wheel design and/or the particular cover design and/or the particular adhesive which are used, the permanent securing means may be provided by the mechanical retention of the tabs 50B and 52B in the groove 22, the adhesive 70, or both.

In the illustrated embodiment, the permanent securing means is preferably the adhesive attachment of the wheel cover 30 to the vehicle wheel 10 and the mechanical attachment of the tabs 50B and 52B of the cover 30 being received in the groove 22 of the wheel 10 is for securing the cover 30 to the wheel 10 while the adhesive 70 cures. Also, as discussed above, since the inner surface 30A of the cover 30 in the areas of the spokes 34 is spaced apart from the outboard face 18 of the wheel 10 by a substantial gap, the standoffs 36A and 36B on the inner surface 30A of the cover 30 act like an "adhesive sink" to assist in securing the wheel cover 30 to the outboard face 14 of the wheel 10. Alternatively, if the gap between the outboard face 14 of the wheel 10 and the inner surface 30A of the wheel cover 30 is small and/or depending upon the particular adhesive which is used, such as for example, an expanding foam adhesive, the standoffs 36 may not needed. Also, as discussed above, the inner surface 30A of the wheel cover 30 preferably includes the circumferential outer diameter standoff 38. The standoff 38 is provided to contact and maintain the proper flange height requirement for balance weight application.

One advantage of the present invention is that a single "common" groove 22 may be used to secure both the wheel cover 30 and the center cap 62 to the wheel. Also, the groove 22 ensures proper fit appearance of the center cap 62 to the cover 30. Also, if an adhesive is used to permanently secure the wheel cover 30 to the wheel 10, the mechanical retention of the wheel cover 30 to the wheel 10 may be used to position, locate and secure the wheel cover 30 on the wheel 10 while the adhesive cures.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle wheel cover retention system comprising:
a wheel defining an axis and including a wheel rim and a wheel disc, said wheel disc including a generally centrally located wheel mounting surface and an outer annular portion which defines an outboard face, said wheel disc having a generally radially outwardly extending single retention groove formed in a generally axially extending portion of said inner mounting surface thereof, said single retention groove having a generally rounded shape and defining a predetermined radius in said axially extending portion of said inner mounting surface of said wheel disc;
a wheel cover including an inner surface, an outer surface and an inner portion having a central opening, said inner portion provided with a plurality of wheel cover retention members, each of said wheel cover retention members provided with at least one snap in tab having a generally rounded shaped outer surface, wherein each of said wheel cover retention members extends a first circumferential distance about said inner portion of said wheel cover and between an associated pair of said wheel cover retention members there is defined a circumferential gap that extends a second circumferential distance about said inner portion of said wheel cover; and a center cap including a plurality of center cap retention members, each of said center cap retention members provided with at least one snap in tab having a generally rounded shaped outer surface;

wherein a respective one of said center cap retention members is configured to be disposed in a respective one of said circumferential gaps of said wheel cover such that said generally rounded shaped outer surface of said at least one snap in tabs of said wheel cover retention members and said generally rounded shaped outer surface of said snap in tabs of said center cap retention members are both received in a snap fit engagement in said single retention groove of said wheel disc to thereby secure both said wheel cover and said center cap to said wheel using only said single retention groove.

2. The vehicle wheel cover retention system of claim 1 wherein an adhesive is selectively applied between at least portions of said outboard face of said wheel disc and said inner surface of said wheel cover.

3. The vehicle wheel cover retention system of claim 1 wherein said inner surface of said wheel cover is provided with a standoff adjacent an outer periphery of said wheel cover.

4. The vehicle wheel cover retention system of claim 3 wherein said standoff is a continuous standoff.

5. The vehicle wheel cover retention system of claim 1 wherein said inner surface of said wheel cover includes selected areas spaced apart from said outboard face of said wheel disc so as to leave a gap therebetween, and wherein said inner surface of said wheel cover is provided with at least one standoff in said selected areas.

6. The vehicle wheel cover retention system of claim 5 wherein said selected areas are in spoke areas of said wheel cover and said wheel disc.

7. A method for producing a vehicle wheel comprising the steps of:
(a) providing a wheel defining an axis and including a wheel rim and a wheel disc, the wheel disc including a generally centrally located wheel mounting surface and an outer annular portion which defines an outboard face, the wheel disc having a generally radially outwardly extending single retention groove formed in a generally axially extending portion of the inner mounting surface thereof, the single retention groove having a generally rounded shape and defining a predetermined radius in the axially extending portion of the inner mounting surface of the wheel disc;
(b) providing a wheel cover including an inner surface, an outer surface and an inner portion having a central opening, the inner portion provided with a plurality of wheel cover retention members, each of the wheel cover retention members provided with at least one snap in tab having a generally rounded shaped outer surface, wherein each of the wheel cover retention members extends a first circumferential distance about the inner portion of the wheel cover and between an associated pair of the wheel cover retention members there is defined a circumferential gap that extends a second circumferential distance about the inner portion of the wheel cover;
(c) providing a center cap including a plurality of center cap retention members, each of the center cap retention members provided with at least one snap in tab having a generally rounded shaped outer surface;
(d) installing the wheel cover on the wheel wherein the generally rounded shaped outer surface of the snap in tabs of the wheel cover retention members is received in a snap fit engagement in the single retention groove of the wheel disc to thereby secure the wheel cover to the wheel using only the single retention groove; and
(e) installing the center cap on the wheel wherein a respective one of the center cap retention members is configured to be disposed in a respective one of the circumferential gaps of the wheel cover such that the generally rounded shaped outer surface of the snap in tabs of the center cap retention members is received in a snap fit engagement in the retention groove to thereby secure the center cap to the wheel using only the single retention groove.

8. The method of claim 7 and further including the step of selectively applied an adhesive between at least portions of the outboard face of the wheel disc and the inner surface of the wheel cover.

9. The method of claim 7 wherein the inner surface of the wheel cover provided in step (b) is provided with a standoff in at least one of an outer periphery thereof and a spoke portion thereof.

10. A vehicle wheel cover retention system comprising:
a wheel defining an axis and including a wheel rim and a wheel disc, said wheel disc including a generally centrally located wheel mounting surface and an outer annular portion which defines an outboard face, said wheel disc having a generally radially outwardly extending single retention groove formed in a generally axially extending portion of said inner mounting surface thereof, said single retention groove having a generally rounded shape and defining a predetermined radius in said axially extending portion of said inner mounting surface of said wheel disc;
a wheel cover including an inner surface, an outer surface and an inner portion having a central opening, said inner portion provided with a plurality of wheel cover retention members, each of said wheel cover retention members provided with at least one snap in tab having a generally rounded shaped outer surface, wherein each of said wheel cover retention members extends a first circumferential distance about said inner portion of said wheel cover and between an associated pair of said wheel cover retention members there is defined a circumferential gap that extends a second circumferential distance about said inner portion of said wheel cover; and
a center cap including a plurality of center cap retention members, each of said center cap retention members provided with at least one snap in tab having a generally rounded shaped outer surface;
wherein a respective one of said center cap retention members is configured to be disposed in a respective one of said circumferential gaps of said wheel cover such that said generally rounded shaped outer surface of said snap in tabs of said wheel cover retention members and said generally rounded shaped outer surface of said snap in tabs of said center cap retention members are both received in a snap fit engagement in said single retention groove of said wheel disc to thereby secure both said wheel cover and said center cap to said wheel using only said single retention groove.
wherein an adhesive is selectively applied between at least portions of said outboard face of said wheel disc and said inner surface of said wheel cover; and
wherein said inner surface of said wheel cover is provided with a standoff adjacent an outer periphery of said wheel cover.

11. The vehicle wheel cover retention system of claim 10 wherein said standoff is a continuous standoff.

12. The vehicle wheel cover retention system of claim 10 wherein said inner surface of said wheel cover includes selected areas spaced apart from said outboard face of said wheel disc so as to leave a gap therebetween, and wherein said inner surface of said wheel cover is provided with at least one standoff in said selected areas.

13. The vehicle wheel cover retention system of claim 12 wherein said selected areas are in spoke areas of said wheel cover and said wheel disc.

* * * * *